Patented Oct. 9, 1951

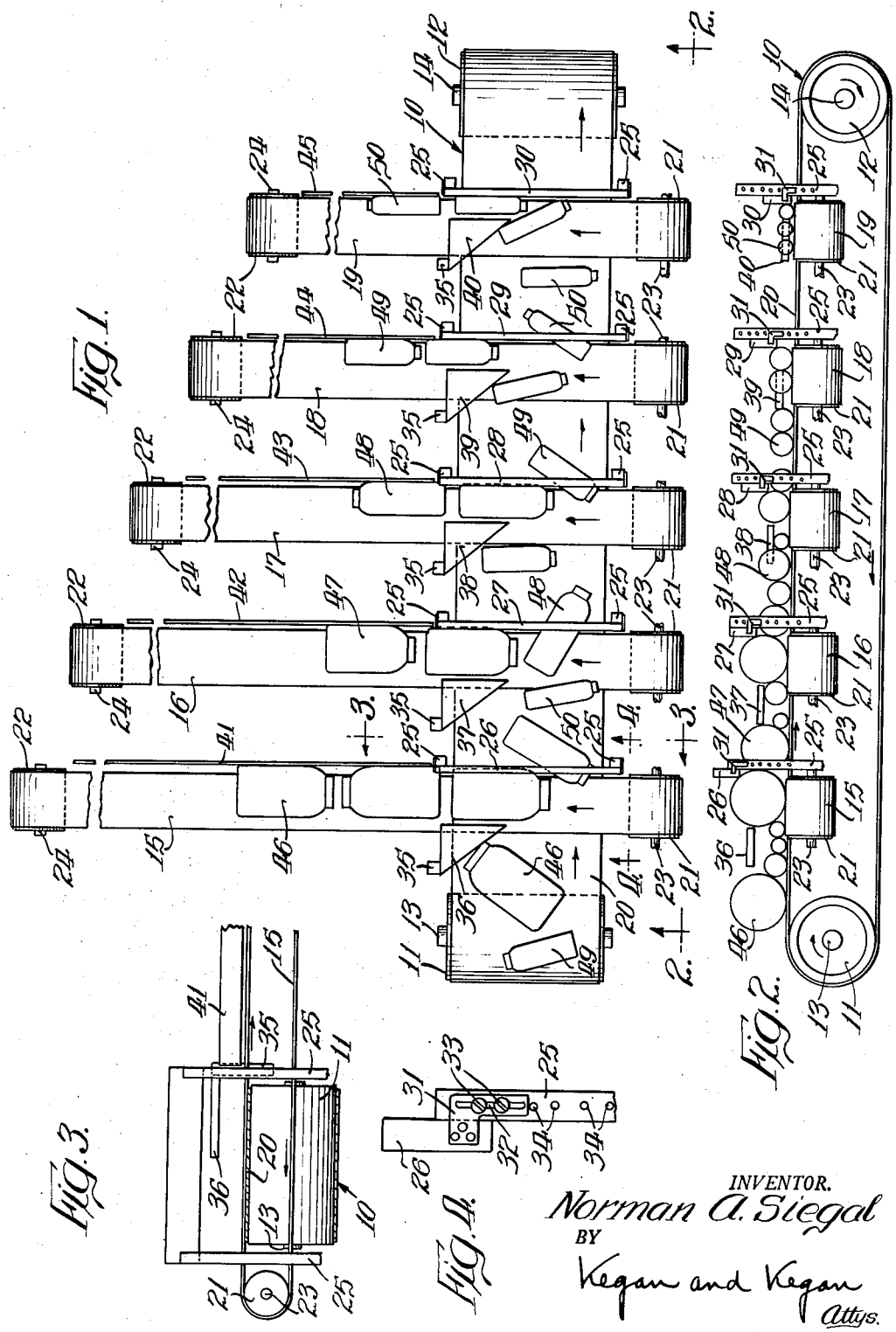

2,570,395

UNITED STATES PATENT OFFICE 2,570,395

ARTICLE SORTING APPARATUS

Norman A. Siegal, Chicago, Ill., assignor to
Irvin Swartzberg, Chicago, Ill.

Application November 17, 1950, Serial No. 196,246

6 Claims. (Cl. 209—90)

My invention relates to improvements in article sorting apparatus, and more particularly to apparatus for sorting and segregating articles such as glass jars and tin cans in accordance with their size.

The principal object of my invention is to provide apparatus which quickly and accurately sorts and segregates different sized articles such as glass jars.

Another object of my invention is to provide apparatus which sorts the articles and places all articles of a given size on a separate conveyor, for further handling.

Another object is the provision of sorting apparatus which is quickly and easily adjusted to change the over-all size range and intermediate gradations of sizes of articles handled and sorted.

In its simplest form, my novel apparatus comprises in combination a first conveyor on one end of which the articles to be sorted are deposited, a second conveyor of thin cross section which crosses over the first conveyor in sliding contact therewith, and which has an upper surface with a relatively low coefficient of friction for the exterior surfaces of the articles, a barrier and means positioning the barrier above the second conveyor so that any article which contacts the barrier is on the second conveyor, and means for moving the conveyors relative to each other at velocities which cause an article on the first conveyor to traverse the second conveyor unless retained by the barrier thereover.

In practice, a plurality of conveyors such as the second conveyor described above are aligned along the first conveyor, and each is provided with a barrier which is suitably positioned so that successive barriers are spaced above their corresponding secondary conveyors in order of decreasing clearance in the direction in which the main conveyor is moving.

In preferred embodiments of my invention, a deflector is positioned in front of each barrier in such a way as to deflect articles on to the corresponding secondary conveyor but in a direction which is opposite to the direction in which the secondary conveyor is moving, thus permitting some movement of the articles crosswise of the main conveyor as they traverse the secondary conveyors, without falling from said main conveyor.

In order that my invention may be more fully disclosed, reference is had to the accompanying drawing which illustrates one form of article handling and sorting apparatus embodying the foregoing and such other principles, advantages or capabilities as may be pointed out as this description proceeds, or as are inherent in the present invention. For purposes of clarity in exposition, the following description is explicit, and the accompanying drawing is detailed, but it is distinctly to be understood that said exposition is illustrative only, and that my invention is not restricted to the particular details recited in the specification or shown in the drawing.

In the drawing:

Figure 1 is a plan view showing somewhat schematically article handling apparatus embodying my invention;

Figure 2 is a front view taken in section on the line 2—2 of Figure 1;

Figure 3 is a fragmentary side view taken in section on the line 3—3 of Figure 1; and Figure 4 is a fragmentary front view taken on the line 4—4 of Figure 1, showing details of the barrier support members.

Like reference characters designate like parts in the drawing and in the description of my article handling and sorting apparatus which follows.

Referring now to the drawing, and more particularly to Figures 1 and 2 thereof, my article sorting and handling apparatus is shown as including a main conveyor belt 10 which is supported by the pulley drums 11 and 12 on the shafts 13 and 14 respectively. A plurality of secondary conveyor belts 15, 16, 17, 18 and 19 are disposed at right angles to the conveyor belt 10, and cross thereover in sliding contact with the upper run 20 of said belt 10. Each of the conveyor belts 15-19 is formed of thin, smooth material and each is supported by two pulley drums 21 and 22 which are in turn rotatable on the shafts 23 and 24 respectively.

Pairs of support members 25, 25 extend upwardly from that side of each of the conveyor belts 15-19 which is furthest from the pulley drum 11. A plurality of barriers 26, 27, 28, 29 and 30 are supported by the various pairs of support members 25, 25, in the manner shown in the drawing. As best shown in Figure 4, a bracket 31 having a slot 32 therein, extends from each end of each of the barriers 26-30, and is adjustably secured to the corresponding support member 25 by the fasteners 33, 33. Each of the support members 25 is provided with vertically spaced pairs of openings 34, 34 which receive the fasteners 33. In this manner, the barriers 26-30 may be adjusted to give varying clearances between each barrier and its corresponding conveyor belt. In any event, the barriers 26-30 are mounted on the support member 25 so as to be spaced above the corresponding belts 15–19 in order of decreasing clearance in the direction in which the upper run 20 of the conveyor belt 10 is moving.

As best shown in Figure 1, a plurality of uprights 35 extend above the conveyor belt 10 on one side thereof, and act as a support for the deflectors 36, 37, 38, 39 and 40. Each of the deflectors 36–40 is substantially triangular in shape, and is so positioned as to direct articles on the upper run 20 of the conveyor belt 10 on to the corresponding conveyor belt 15–19, and in a direction which is generally opposite to the direction in which said conveyor belt 15–19 is moving, all for a purpose to be described presently. In addition, a plurality of railings 41, 42, 43, 44 and 45 are positioned along corresponding sides of the conveyor belt 15–19, to retain articles thereon.

Articles which are to be sorted, such as for example a plurality of glass bottles, are placed on the conveyor belt 10 in front of the conveyor belt 15 crossing thereover. In practice it is not unusual to have bottles of diverse sizes all processed through a single pasteurizer unit, in which case the output side of the unit could be connected directly to the conveyor belt 10. Thus, for example, bottles 46 of gallon size, bottles 47 of half-gallon size, bottles 48 of quart size, bottles 49 of pint size, and bottles 50 of half-pint size might be disposed on the conveyor belt 10 for sorting, with each bottle lying on its side. In this case, the barrier 26 would be adjusted to retain the bottles 46, but to pass the other bottles 47–50. Similarly, the other barriers 27–30 would be set to retain respectively the bottles 47, 48, 49 and 50. In each case, the corresponding deflector 36–40 deflects the bottles being handled on to the corresponding belt 15–19 so that any motion which said belts 15–19 might impart to the bottles tending to move it crosswise of the conveyor belt 10, would not be sufficient to cause the bottle to fall from the belt 10. Each of the conveyor belts 15–19 may in turn be connected to bottle packing machinery or other article handling apparatus in which it is desirable or essential that bottles of only one size be worked on.

From the foregoing it will be apparent that the major portion of the bottles must traverse one or more of the conveyor belts 15–18. To insure that the bottles do traverse said belts, sufficient momentum must be imparted to each of them to overcome any braking effect which the belts 15–18 may exert, which would tend to retain them on the wrong conveyor belt 15–18. To this end, I prefer that the belt 10 be of such material as rubber impregnated canvas or any other material which tends to hold and grip the bottles 46–50 thereon. In addition, by driving the belt 10 at a reasonably high linear velocity, such as for example 40 feet per minute, ample momentum is imparted to the various bottles 46–50 to insure their passing, over one or more of the belts 15–18, provided of course they are not retained by the barriers 26–29. In addition, I prefer that the belts 15–19 be of a thin hard material, such as for example spring steel which is less than about $\frac{1}{16}$ inch thick, and preferably no more than about $\frac{3}{32}$ inch thick. By moving the various belts 15–19 at a linear speed such as 60 feet per minute, there is very little sidewise movement of the bottles 47–49 in moving over the belts 15–18. This is due both to the low coefficient of friction between the belts 15–18 and the bottles 47–49, and the speed with which the said belts 15–18 are moved across the conveyor belt 10. Nevertheless, as one of the bottles 46–50 is retained by its corresponding barrier 26–30, there is a sufficient sliding frictional force between the bottle and the corresponding belt 15–19 to move the bottle along the belt away from the belt 10.

While sheet spring steel is especially useful as a material from which the conveyor belt 15–19 may be formed, any suitable flexible belting material which is less than about $\frac{1}{16}$ inch thick, and which has a coefficient of sliding friction with the article being handled of less than about 0.50, and preferably less than 0.25, may be used.

While in the drawing and in the description thereof the articles being handled are glass bottles, obviously the same apparatus can be used for sorting tin cans and many other articles which are produced, processed or otherwise handled in different sizes.

Having thus fully disclosed my novel article sorting and handling apparatus, and demonstrated its utility by reference to a specific embodiment thereof, I claim as my invention:

1. Apparatus for sorting glass bottles of different sizes, comprising in combination: a main conveyor belt on one end of which said bottles are deposited, a plurality of thin, smooth spring steel belts traversing said main belt from one side thereof to the other side thereof, a plurality of barriers and mounting means therefor, each of said barriers being positioned above a different one of said steel belts on that side thereof which is furthest from said one end of said main belt, said barriers further being spaced above said belts in order of decreasing clearance from said one end of said main belt to the other end thereof, a plurality of bottle deflectors and mounting means therefor, each of said deflectors being positioned above a different one of said steel belts to deflect bottles toward said one side of said main belt, and means for driving said main belt and each of said steel belts so that a bottle which is deposited on any one of said steel belts and is not retained by the barrier thereover, traverses said steel belt and returns to said main belt.

2. Apparatus for sorting glass bottles of different sizes, comprising in combination: a main conveyor belt adapted to have deposited on one end thereof a quantity of said bottles, a spring steel belt no more than about $\frac{1}{16}$ inch thick, means for supporting said steel belt to cross over from one side to the other side and be in sliding contact with the upper run of said conveyor belt and substantially at right angles thereto, a barrier and means for adjustably positioning said barrier over said steel belt and substantially parallel to the direction of travel of said steel belt, said barrier further being positioned so that any bottle engaging said barrier is on said steel belt, a deflector and means for positioning said deflector to direct bottles toward said one side of said main conveyor belt, and means for driving said main conveyor belt and said steel belt so that a bottle which is deposited on said steel belt but is not retained by said barrier traverses said steel belt and returns to said main conveyor belt.

3. Apparatus for sorting containers of different sizes, comprising in combination: a main conveyor belt on one end of which said containers may be deposited, a plurality of secondary belts traversing said main belt and each having a smooth hard outer surface which has a low coefficient of friction for the material from which the exterior surfaces of said containers are formed, a plurality of barriers and mounting means therefor, each of said barriers being positioned above a different one of said secondary belts on that side thereof furthest from said one end of said main belt, said barriers further being spaced above said belts in order of decreasing clearance in the direction in which said main belt is moving, and means for driving said main belt and each of said secondary belts so that a container which is deposited on any one of said secondary belts and is not retained by the barrier thereover, slides off said secondary belt on to said main belt.

4. Apparatus for sorting containers of different sizes, comprising in combination: a main conveyor belt adapted to have deposited on one end thereof a quantity of said bottles, a second belt less than $\frac{1}{16}$ inch thick and having a smooth hard outer surface which has a low coefficient of friction for the material from which the exterior surfaces of said containers are formed, means for supporting said second belt to cross over and be in sliding contact with the upper run of said main belt, a barrier and means for positioning said barrier over said second belt and substantially parallel to the direction of travel of said second belt, said barrier further being positioned so that any container engaging said barrier is on said second belt, and means for driving said main belt and said second belt so that a container which is deposited on said second belt but is not retained by said barrier slides off said second belt onto said main belt.

5. Apparatus for sorting articles of different sizes, comprising in combination: a main conveyor on one end of which articles to be sorted are deposited, a plurality of secondary conveyors crossing over said main conveyor in sliding contact therewith and each having an upper surface which has a relatively low coefficient of friction for the exterior surfaces of said articles, a plurality of barriers and mounting means therefor, each of said barriers being positioned above a different one of said secondary conveyors so that any article which contacts one of said barriers is on the corresponding secondary conveyor, said barriers further being spaced above said secondary conveyors in order of decreasing clearance in the direction in which said main conveyor is moving, and means for moving said conveyor relative to each other at velocities which cause an article on said main conveyor to successively traverse said secondary belts until arrested by one of said barriers.

6. Apparatus for sorting articles of different sizes, comprising in combination: a first conveyor on one end of which articles to be sorted are deposited, a second conveyor of thin cross section crossing over said first conveyor in sliding contact therewith and having an upper surface which has a relatively low coefficient of friction for the exterior surfaces of said articles, a barrier, means positioning said barrier above said second conveyor so that any article which contacts said barrier is on said second conveyor, and means for moving said conveyors relative to each other at velocities which cause an article on said first conveyor to traverse said second conveyor unless retained by said barrier.

NORMAN A. SIEGAL.

REFERENCES CITED

The following references are of record in the file of this patent:

UNITED STATES PATENTS

| Number | Name | Date |
|---|---|---|
| 888,408 | Strain | May 19, 1908 |
| 2,059,776 | De Back | Nov. 3, 1936 |
| 2,346,583 | Jackson | Apr. 11, 1944 |